(12) United States Patent
Trefler et al.

(10) Patent No.: US 6,365,117 B1
(45) Date of Patent: Apr. 2, 2002

(54) METHOD FOR PREPARING PHOSPHORIC ACID

(75) Inventors: Bronisław Trefler; Stanisław Folek; Kazimierz Łach; Jeremi Marszałek, all of Gliwice; Piotr Masztalerz, Police; Jan Sosnowski, Police; Jerzy Sowa, Police; Zbigniew Tomaszewski, Szczecin; Andrzej Wysocki, Police, all of (PL)

(73) Assignees: Instytut Chemii Nieorganicznej, Gilwice; Zaklady Chemiczne Police S.A., Police, both of (PL)

( * ) Notice: Subject to any disclaimer, the term of this patent is extended or adjusted under 35 U.S.C. 154(b) by 0 days.

(21) Appl. No.: 09/355,047

(22) PCT Filed: Jan. 30, 1998

(86) PCT No.: PCT/PL98/00003

§ 371 Date: Sep. 13, 1999

§ 102(e) Date: Sep. 13, 1999

(87) PCT Pub. No.: WO98/38127

PCT Pub. Date: Sep. 3, 1998

(30) Foreign Application Priority Data

Feb. 26, 1997 (PL) ................................................ 318706

(51) Int. Cl.[7] .......................... C01B 25/32; C01B 25/16
(52) U.S. Cl. .................................. 423/157.4; 423/320
(58) Field of Search ............................. 423/157.4, 320, 423/157.2

(56) References Cited

U.S. PATENT DOCUMENTS

| 3,984,525 A | * 10/1976 | Williams et al. | ......... 423/157.4 |
| 4,039,616 A | * 8/1977 | Scheec et al. | ............ 423/157.4 |
| 4,233,278 A | 11/1980 | Korchnak | ................... 423/321 |
| 4,325,928 A | * 4/1982 | Lowe | ......................... 423/320 |
| 4,503,022 A | 3/1985 | Majumdar | .................. 423/321 |
| 4,555,388 A | * 11/1985 | Hundebol | ............... 423/157.2 |
| 4,557,909 A | * 12/1985 | Mair | ...................... 423/157.2 |
| 4,643,883 A | 2/1987 | Borchert et al. | ............ 423/321 |
| 4,702,896 A | * 10/1987 | Mair | ...................... 423/157.4 |
| 4,808,391 A | 2/1989 | Leavitt et al. | .............. 423/321 |
| 4,834,787 A | * 5/1989 | Ratliff et al. | ............... 423/320 |

FOREIGN PATENT DOCUMENTS

BR 8502915 8/1988

OTHER PUBLICATIONS

Dos Santos, Benedetto, J. "Oxidizing Agent for Phosphoric Acid Production from Phosphate by the Wet Method." Chemical Abstracts, vol.110, No. 12 (1989). (no month).
English translation of abstract and claims of BR 8502915 dated Aug. 23, 1988.
White, Jack C. "Ozone Treatment of Wet–Process Phosphoric Acid." Chemical Abstracts vol. 96, No. 6 (1982). (no month).
Belfadhel, H. et al. "Removal of Color and Organic Matter in Industrial . . . " Ozone: Science & Engineering, vol. 17, No. 6, (1995) pp. 637–645. (no month).

* cited by examiner

Primary Examiner—Wayne Langel
(74) Attorney, Agent, or Firm—Ladas & Parry

(57) ABSTRACT

A method for preparing phosphoric acid from calcium phosphate ores, particularly ores highly contaminated with organic compounds, by decomposing the ore with sulphuric acid, wherein according to the invention the process of decomposition of calcium phosphate ores with sulphuric acid and circulating phosphoric acid is carried out in oxidizing conditions provided by a constant supply of ozone to the reaction slurry, preferably to the zone of commencing decomposition of the phosphate ores.

2 Claims, 1 Drawing Sheet

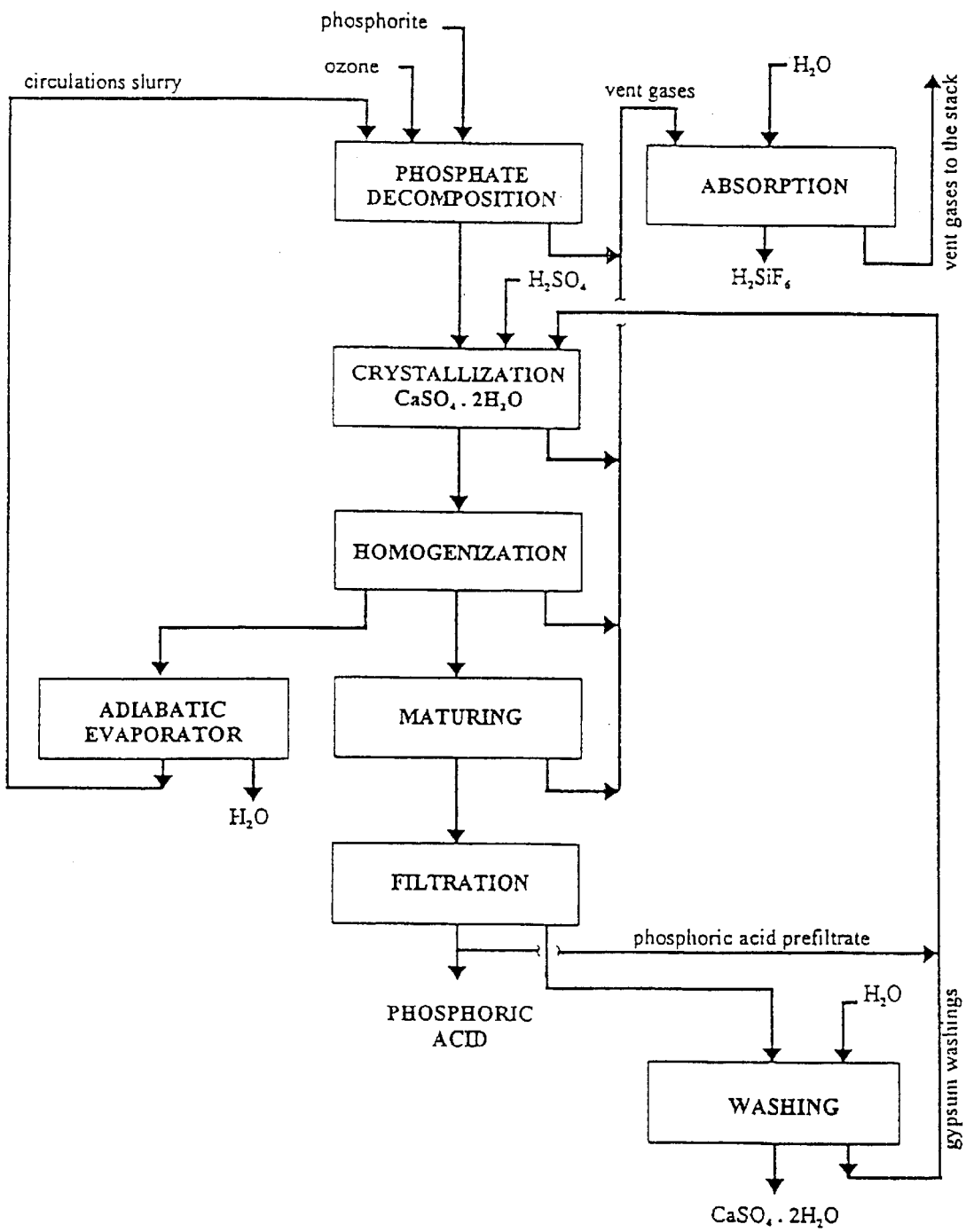

METHOD FOR PREPARING PHOSPHORIC ACID

The present invention relates to a method for preparing phosphoric acid by a wet method, so called extraction phosphoric acid, from calcium phosphate ores, e.g. phosphorites and apatites and sulphuric acid.

In processes for production of extraction phosphoric acid mainly ground mineral phosphorites or phosphorites enhanced by concentration processes are used. These contain generally fluoroapatite, frequently supplemented with small quantities of mixed apatites and, depending on the origin, various mineral contaminants such as quartz, calcite, dolomite, loamy matter and variously mineralized organic compounds and/or organic compounds introduced in the course of concentration.

From the chemical point of view natural calcium fluorophosphates are always accompanied by great number of various salts of magnesium, aluminium, iron and other cations including rare earth and radioactive elements. Organic contaminants of phosphorites comprise mainly humus and bituminous compounds with a small concentrations of sulphur (II), phosphorus (III) and nitrogen compounds.

In the process for production of extraction phosphoric acid the basic reactions of decomposition of apatite with sulphuric acid are accompanied by a number of various simultaneous side reactions of said contaminants. These reactions influence greatly the quality of phosphoric acid and the course and yield of the process for production of the same.

Organic contaminants of phosphate ores exert a particularly adverse effect on the process for production of phosphoric acid. Already at the extraction stage they are adsorbed on the surfaces of gypsum crystallisation, block active sites of crystals and limit capabilities of their growth. In consequence of this suspensions hard to filter appear having sticky structure of a filtered precipitate and high content of residual phosphoric acid hard to wash out.

The substantial part of organic contaminants is dissolved in resulting phosphoric acid giving it a typical dark-brown colour and enlarging its viscosity and surface tension. Gaseous reaction products, generally carbon dioxide, under this conditions bring about an abundant and stable foam which lowers the rate of extraction and mass yield of the reactor.

Some known and most frequently used mechanical and chemical methods for quenching foam are not always useful and frequently ameliorate the arduousness of the occurrence to a small degree only.

At high temperatures of reaction with phosphoric acid and sulphuric acid the organic compounds contained in some phosphorites liberate to the flue gases vapours of both saturated and unsaturated fatty acids, various organic amines, sulphides and phosphines distinguishing with their strong, repulsive odour. Having been vented with flue gases to the atmosphere, the compounds can be detected even in trace amounts in the distance of tens of kilometers from the phosphoric acid production facility. Attempts to deodorise the vented gases by known methods, e.g. thermal and catalytic oxidation, adsorption on surface active materials, or destruction in bio-reactors failed to achieve success, though the methods are successfully utilised in another branches of industry, e.g. heavy chemical synthesis, tobacco industry, food industry etc.

According to the current state of knowledge the only known efficient method of making phosphorites with high content of organic contaminants suitable for the process for production of extraction phosphoric acid is to precalcine phosphorite in oxidizing conditions at temperatures of alkaline earth carbonates decomposition. However, the method is energy-consuming and applied in special cases, e.g. to produce special extraction phosphoric acid completely devoid of organic contaminants for further purification by solvent extraction. Most frequently such phosphorites are not processed, though they are cheap and readily available, and raw materials more expensive, but less troublesome in processing are used.

Therefore, the object of the present invention is to make independent the process for preparing phosphoric acid by a "wet" method independence of the type and kind of calcium phosphate ore, and particularly of the type and amount of organic contaminants contained therein, at eliminating the emission of offensive odours, at the distinct reduction of reaction pulp foaming and at improving the filtrating properties of resulting phosphogypsum.

This object is achieved through a method for preparing phosphoric acid from calcium phosphate ores, especially the ores highly contaminated with organic compounds, by decomposing the ore with sulphuric acid, wherein according to the invention the process of decomposition of the calcium phosphate ores with sulphuric acid and circulating phosphoric acid is carried out in oxidizing conditions by a constant supply of ozone to the reaction slurry, preferably to the zone of commencing decomposition of the phosphate ores.

The sole FIGURE of the Drawings represents a flow diagram of the process according to the invention.

The experiments have shown that organic compounds introduced with phosphorites to the extraction process change their physicochemical properties under the influence of strong oxidizers, such as peroxide compounds, or particularly fast and efficiently under the influence of gaseous ozone, introduced to the reaction. The oxidation products are almost completely insoluble in phosphoric acid, thus explaining the disappearance of adverse effects of organic contaminants. In particular the viscosity and surface tension are significantly reduced giving directly rise to over 60% vanishing of foaming of phosphorites reacting with acid, and vent gases emerging from quickly vanishing foam are completely devoid of the original repulsive odour. At the same time the presence of ozone causes calcium sulphate dihydrate to precipitate as uniform and well shaped crystals. The slurries thus formed are easy to filtrate, and resulting filter cakes are easily washed off of the acid. The filtrate acid contains emulsified insoluble organic compounds which coagulate readily and sediment with the secondary precipitate. The settled acid loses its typical brownish colour getting clear pale green or olive-green tinge.

One of the advantage of the invention is the fact that it is reliable and effective for various calcium phosphate ores despite of their origin, type and kind, and particularly despite of the type and concentration of organic contaminants.

The additional advantage is the simplicity of the inventive method which enables using it without any essential modifications of techniques for preparing extraction phosphoric acid and any structural changes in the apparatus on the production plant except for adding an ozone generator and the means for feeding ozone to the reactor.

The method is illustrated below by the way of example.

EXAMPLE

The Example illustrates the course of the process in a single multi-section model reactor provided with a central two-level blade agitator for test research of usefulness of calcium phosphate ores for preparing extraction phosphoric acid according to a scheme depicted on the enclosed Figure.

To the central chamber 525 kg/h of circulating slurry at 80°C. containing 34% of crystalline $CaSO_4 \cdot 2 H_2O$ in phosphoric acid at a concentration of 30% $P_2O_5$ and 10 kg/h of phosphorite containing 29.5% $P_2O_5$, 32% Ca, 2.8% F, 0.54% organic compounds expressed as elemental carbon is introduced with continuous stirring, and 0.6 g/h ozone as a 16% (w/w) mixture with pure oxygen or a 4% (w/w) mixture with air is constantly charged. Ozone is introduced just below the level of upper blades of the agitator through a diffuser to diffuse the gas in the highest degree throughout the reaction slurry. The temperature in the reactor is kept at 82±2° C. The slurry is then supplemented in the calcium sulphate crystallization zone with 8.8 kg/h sulphuric acid at a concentration of 95% diluted previously to 56% with a mixed solution of a phosphoric acid prefiltrate and gypsum washings at a rate of 6.1 kg/h.

After averaging the chemical composition of the slurry in the homogenization zone 90% of the mass is directed to an adiabatic evaporator to concentrate it and subsequently recirculate to the zone of the initial ore decomposition. The rest of the slurry is directed to stages of maturing and subsequent filtration.

The process produces about 9.4 kg/h of extraction sphoric acid at a concentration of 30% $P_2O_5$, which after maturing becomes a clear solution of pale green or olive-green colour containing about 0.03% of organic matter expressed as carbon. The filtered phosphogypsum at a rate of 29.6 kg/h comprising 13.5% $P_2O_5$ is washed with 21.6 kg/h yielding 22.7 kg of washings containing 17% $P_2O_5$ and mixture 7 kg/h of washed phosphogypsum at a moisture level of 25% containing at average total 0.8 $P_2O_5$.

What is claimed is:

1. A method for preparing phosphoric acid from calcium phosphate ores contaminated with organic compounds, comprising mixing said calcium phosphate ores with a slurry comprising phosphoric acid and calcium sulfate in a reactor, treating the calcium phosphate ores-containing slurry with ozone and with sulphuric acid, wherein the ozone causes calcium sulphate dihydrate to precipitate out, recovering phosphoric acid from the slurry and recirculating a portion of the treated slurry to said reactor.

2. A method for preparing phosphoric acid from calcium phosphate ores contaminated with organic compounds, comprising:

introducing said calcium phosphate ores to a slurry and ozone in a reactor comprising a central chamber, wherein the slurry comprises phosphoric acid;

mixing the calcium phosphate, slurry and ozone to create a reaction slurry;

moving the reaction slurry from the central chamber to a crystallization zone carried out in oxidizing conditions provided by a constant supply of ozone, wherein the ozone causes calcium sulphate dihydrate to precipitate out;

recirculating part of the reaction slurry to the central chamber to be used as the slurry to introduce other calcium phosphate ores;

filtering the reaction slurry remaining in the crystallization zone to obtain the phosphoric acid.

* * * * *